United States Patent
Gondi et al.

(10) Patent No.: US 7,584,474 B2
(45) Date of Patent: Sep. 1, 2009

(54) SYSTEMS AND METHODS FOR TRANSACTION CHAINING

(75) Inventors: Albert Gondi, Santa Clara, CA (US); Michael Blow, San Jose, CA (US); Pal Takacsi-Nagy, Cupertino, CA (US)

(73) Assignee: BEA Systems, Inc., San Jose, CA (US)

( * ) Notice: Subject to any disclaimer, the term of this patent is extended or adjusted under 35 U.S.C. 154(b) by 975 days.

(21) Appl. No.: 10/785,702

(22) Filed: Feb. 24, 2004

(65) Prior Publication Data

US 2004/0187127 A1 Sep. 23, 2004

Related U.S. Application Data

(60) Provisional application No. 60/449,925, filed on Feb. 25, 2003.

(51) Int. Cl.
- G06F 9/46 (2006.01)
- G06F 11/00 (2006.01)
- G06F 3/00 (2006.01)
- G06F 17/30 (2006.01)

(52) U.S. Cl. .................. 718/101; 718/100; 718/108; 714/15; 714/16; 714/20; 719/314; 719/315; 719/328; 707/200; 707/202

(58) Field of Classification Search ............ 718/1–108; 709/230, 9, 201; 707/10, 1, 2, 3, 8, 9, 200, 707/201, 202; 714/15, 16, 17, 18, 19, 20; 719/313, 314, 315, 316, 328, 329
See application file for complete search history.

(56) References Cited

U.S. PATENT DOCUMENTS

| 5,469,562 | A | 11/1995 | Saether |
| 5,604,860 | A | 2/1997 | McLaughlin et al. |

(Continued)

FOREIGN PATENT DOCUMENTS

| CA | 2248634 | 3/2000 |

(Continued)

OTHER PUBLICATIONS

HP NonStop Tuxedo Release Guide, 8.0; Nov. 2002.*

(Continued)

*Primary Examiner*—Van H Nguyen
*Assistant Examiner*—Abdullah Al Kawsar
(74) *Attorney, Agent, or Firm*—Fliesler Meyer LLP

(57) ABSTRACT

A transaction management engine, such as a business process management (BPM) engine, can allow an application to define transaction demarcations in order to ensure that portions of a workflow are processed atomically. In one such system, a JMS message is queued to the workflow as part of an existing transaction. If that transaction commits, the queued JMS message ensures that the workflow will be invoked in a new transaction that allows the workflow to perform the next unit of work in the newly initiated transaction. When the unit of work is completed, the workflow queues another JMS message. If this transaction commits, the transaction ensures the unit of work has executed in a transaction. When the workflow is invoked again due to the second JMS message, the workflow can continue its operation in a different transaction.

6 Claims, 4 Drawing Sheets

U.S. PATENT DOCUMENTS

| | | | |
|---|---|---|---|
| 5,630,131 A | 5/1997 | Palevich et al. | |
| 5,680,610 A * | 10/1997 | Smith et al. | 707/10 |
| 5,872,971 A * | 2/1999 | Knapman et al. | 718/101 |
| 5,944,794 A | 8/1999 | Okamoto et al. | |
| 5,946,316 A * | 8/1999 | Chen et al. | 370/408 |
| 5,966,535 A | 10/1999 | Benedikt et al. | |
| 6,009,405 A * | 12/1999 | Leymann et al. | 705/9 |
| 6,012,083 A | 1/2000 | Savitzky et al. | |
| 6,012,094 A * | 1/2000 | Leymann et al. | 709/230 |
| 6,016,495 A | 1/2000 | McKeehan et al. | |
| 6,018,730 A | 1/2000 | Nichols et al. | |
| 6,023,578 A | 2/2000 | Birsan et al. | |
| 6,029,000 A | 2/2000 | Woolsey et al. | |
| 6,067,623 A | 5/2000 | Blakley et al. | |
| 6,070,184 A | 5/2000 | Blount et al. | |
| 6,141,701 A | 10/2000 | Whitney | |
| 6,148,336 A | 11/2000 | Thomas et al. | |
| 6,212,546 B1 | 4/2001 | Starkovich et al. | |
| 6,219,666 B1 * | 4/2001 | Krishnaswamy et al. | 707/8 |
| 6,222,533 B1 | 4/2001 | Notani et al. | |
| 6,243,737 B1 | 6/2001 | Flanagan et al. | |
| 6,243,778 B1 * | 6/2001 | Fung et al. | 710/113 |
| 6,292,932 B1 | 9/2001 | Baisley et al. | |
| 6,311,327 B1 | 10/2001 | O'Brien et al. | |
| 6,330,569 B1 | 12/2001 | Baisley et al. | |
| 6,334,114 B1 | 12/2001 | Jacobs et al. | |
| 6,343,265 B1 | 1/2002 | Glebov et al. | |
| 6,360,358 B1 | 3/2002 | Elsbree et al. | |
| 6,367,068 B1 | 4/2002 | Vaidyanathan et al. | |
| 6,377,939 B1 | 4/2002 | Young | |
| 6,408,311 B1 | 6/2002 | Baisley et al. | |
| 6,411,698 B1 | 6/2002 | Bauer et al. | |
| 6,445,711 B1 | 9/2002 | Scheel et al. | |
| 6,470,364 B1 | 10/2002 | Prinzing | |
| 6,516,322 B1 * | 2/2003 | Meredith | 707/102 |
| 6,560,769 B1 | 5/2003 | Moore et al. | |
| 6,584,454 B1 | 6/2003 | Hummel et al. | |
| 6,594,700 B1 | 7/2003 | Graham et al. | |
| 6,601,113 B1 | 7/2003 | Koistinen et al. | |
| 6,609,115 B1 | 8/2003 | Mehring et al. | |
| 6,615,258 B1 | 9/2003 | Barry et al. | |
| 6,625,602 B1 * | 9/2003 | Meredith et al. | 707/8 |
| 6,636,491 B1 | 10/2003 | Kari et al. | |
| 6,637,020 B1 | 10/2003 | Hammond | |
| 6,654,932 B1 | 11/2003 | Bahrs et al. | |
| 6,678,518 B2 | 1/2004 | Eerola | |
| 6,684,388 B1 | 1/2004 | Gupta et al. | |
| 6,687,702 B2 | 2/2004 | Vaitheeswaran et al. | |
| 6,687,848 B1 | 2/2004 | Najmi | |
| 6,721,740 B1 | 4/2004 | Skinner et al. | |
| 6,721,779 B1 | 4/2004 | Maffeis | |
| 6,748,420 B1 | 6/2004 | Quatrano et al. | |
| 6,754,884 B1 | 6/2004 | Lucas et al. | |
| 6,789,054 B1 | 9/2004 | Makhlouf | |
| 6,804,686 B1 | 10/2004 | Stone et al. | |
| 6,823,495 B1 | 11/2004 | Vedula et al. | |
| 6,832,238 B1 * | 12/2004 | Sharma et al. | 709/201 |
| 6,836,883 B1 | 12/2004 | Abrams et al. | |
| 6,847,981 B2 | 1/2005 | Song et al. | |
| 6,850,979 B1 | 2/2005 | Saulpaugh et al. | |
| 6,853,876 B2 * | 2/2005 | Wehrung et al. | 700/230 |
| 6,859,180 B1 | 2/2005 | Rivera | |
| 6,874,143 B1 | 3/2005 | Murray et al. | |
| 6,889,244 B1 | 5/2005 | Gaither et al. | |
| 6,915,519 B2 | 7/2005 | Williamson et al. | |
| 6,918,053 B1 * | 7/2005 | Thatte et al. | 714/16 |
| 6,918,084 B1 | 7/2005 | Slaughter et al. | |
| 6,922,792 B2 * | 7/2005 | Moser et al. | 714/4 |
| 6,922,827 B2 | 7/2005 | Vasilik et al. | |
| 6,950,872 B2 | 9/2005 | Todd, II | |
| 6,963,914 B1 | 11/2005 | Breitbart et al. | |
| 6,971,096 B1 | 11/2005 | Ankireddipally et al. | |
| 6,973,657 B1 * | 12/2005 | Ahmad et al. | 719/315 |
| 6,976,086 B2 | 12/2005 | Sadeghi et al. | |
| 6,988,099 B2 * | 1/2006 | Wiser et al. | 707/8 |
| 7,000,219 B2 | 2/2006 | Barrett et al. | |
| 7,017,146 B2 | 3/2006 | Dellarocas et al. | |
| 7,039,671 B2 * | 5/2006 | Cullen | 709/201 |
| 7,043,722 B2 | 5/2006 | Bau, III | |
| 7,051,316 B2 | 5/2006 | Charisius et al. | |
| 7,054,858 B2 | 5/2006 | Sutherland | |
| 7,062,718 B2 | 6/2006 | Kodosky et al. | |
| 7,069,507 B1 | 6/2006 | Alcazar et al. | |
| 7,072,934 B2 | 7/2006 | Helgeson et al. | |
| 7,073,167 B2 | 7/2006 | Iwashita | |
| 7,076,772 B2 | 7/2006 | Zatloukal | |
| 7,096,422 B2 | 8/2006 | Rothschiller et al. | |
| 7,107,578 B1 | 9/2006 | Alpern | |
| 7,111,243 B1 | 9/2006 | Ballard et al. | |
| 7,117,214 B2 * | 10/2006 | Wiser et al. | 707/10 |
| 7,117,504 B2 | 10/2006 | Smith et al. | |
| 7,127,704 B2 | 10/2006 | Van De Vanter et al. | |
| 7,143,186 B2 | 11/2006 | Stewart et al. | |
| 7,146,422 B1 | 12/2006 | Marlatt et al. | |
| 7,155,705 B1 | 12/2006 | Hershberg et al. | |
| 7,184,967 B1 | 2/2007 | Mital et al. | |
| 7,206,805 B1 * | 4/2007 | McLaughlin, Jr. | 709/203 |
| 7,240,331 B2 | 7/2007 | Vion-Dury et al. | |
| 7,260,599 B2 | 8/2007 | Bauch et al. | |
| 7,380,166 B2 * | 5/2008 | Thatte et al. | 714/20 |
| 7,391,735 B2 * | 6/2008 | Johnson | 370/246 |
| 2002/0004848 A1 | 1/2002 | Sudarshan et al. | |
| 2002/0010781 A1 | 1/2002 | Tuatini | |
| 2002/0010803 A1 | 1/2002 | Oberstein et al. | |
| 2002/0035604 A1 | 3/2002 | Cohen et al. | |
| 2002/0049788 A1 | 4/2002 | Lipkin et al. | |
| 2002/0073236 A1 | 6/2002 | Helgeson et al. | |
| 2002/0073396 A1 | 6/2002 | Crupi et al. | |
| 2002/0083075 A1 | 6/2002 | Brummel et al. | |
| 2002/0111922 A1 | 8/2002 | Young et al. | |
| 2002/0120685 A1 | 8/2002 | Srivastava et al. | |
| 2002/0143960 A1 | 10/2002 | Goren et al. | |
| 2002/0152106 A1 | 10/2002 | Stoxen et al. | |
| 2002/0161826 A1 | 10/2002 | Arteaga et al. | |
| 2002/0174178 A1 | 11/2002 | Stawikowski | |
| 2002/0174241 A1 | 11/2002 | Beged-Dov et al. | |
| 2002/0184610 A1 | 12/2002 | Chong et al. | |
| 2002/0194244 A1 | 12/2002 | Raventos | |
| 2002/0194267 A1 | 12/2002 | Flesner et al. | |
| 2002/0194495 A1 | 12/2002 | Gladstone et al. | |
| 2003/0004746 A1 | 1/2003 | Kheirolomoom et al. | |
| 2003/0005181 A1 | 1/2003 | Bau et al. | |
| 2003/0014439 A1 | 1/2003 | Boughannam | |
| 2003/0018661 A1 | 1/2003 | Darugar | |
| 2003/0018832 A1 | 1/2003 | Amirisetty et al. | |
| 2003/0023957 A1 | 1/2003 | Bau et al. | |
| 2003/0028364 A1 | 2/2003 | Chan et al. | |
| 2003/0028579 A1 | 2/2003 | Kulkarni et al. | |
| 2003/0043191 A1 | 3/2003 | Tinsley et al. | |
| 2003/0046591 A1 | 3/2003 | Asghari-Kamrani et al. | |
| 2003/0051066 A1 | 3/2003 | Pace et al. | |
| 2003/0055868 A1 | 3/2003 | Fletcher et al. | |
| 2003/0055878 A1 | 3/2003 | Fletcher et al. | |
| 2003/0074217 A1 | 4/2003 | Beisiegel et al. | |
| 2003/0079029 A1 | 4/2003 | Garimella et al. | |
| 2003/0110446 A1 | 6/2003 | Nemer | |
| 2003/0120593 A1 * | 6/2003 | Bansal et al. | 705/39 |
| 2003/0126136 A1 | 7/2003 | Omoigui | |
| 2003/0149791 A1 | 8/2003 | Kane et al. | |
| 2003/0167358 A1 | 9/2003 | Marvin et al. | |
| 2003/0196168 A1 | 10/2003 | Hu | |
| 2004/0019645 A1 | 1/2004 | Goodman et al. | |
| 2004/0019684 A1 | 1/2004 | Potter et al. | |
| 2004/0025169 A1 * | 2/2004 | Wiser et al. | 719/315 |

| | | | |
|---|---|---|---|
| 2004/0040011 A1 | 2/2004 | Bosworth et al. | |
| 2004/0078373 A1 | 4/2004 | Ghoneimy et al. | |
| 2004/0103406 A1 | 5/2004 | Patel | |
| 2004/0148336 A1 | 7/2004 | Hubbard et al. | |
| 2004/0204976 A1 | 10/2004 | Oyama et al. | |
| 2004/0216086 A1 | 10/2004 | Bau | |
| 2004/0260715 A1 | 12/2004 | Mongeon | |
| 2005/0050068 A1 | 3/2005 | Vaschillo et al. | |
| 2005/0144170 A1* | 6/2005 | Wiser et al. | 707/8 |
| 2005/0278585 A1 | 12/2005 | Spencer | |
| 2006/0206856 A1 | 9/2006 | Breeden et al. | |
| 2006/0234678 A1 | 10/2006 | Juitt et al. | |
| 2007/0038500 A1 | 2/2007 | Hammitt et al. | |

FOREIGN PATENT DOCUMENTS

| | | | |
|---|---|---|---|
| JP | 10069418 A | * | 3/1998 |
| JP | 2001188696 A | * | 7/2001 |
| WO | WO 9923558 | | 5/1999 |
| WO | WO 0029924 | | 5/2000 |

OTHER PUBLICATIONS

Stefan Tai "Dependency-spheres: A global transaction context for distributed objects and messages", IEEE 2001, pp. 105-115.*

Sharma, "J2EE Connector Architecture Specification, Version 1.0 Final Release", Java 2 Enterprise Edition, Aug. 2001, 90 pages, Sun Microsystems.

Allamaraju, et al., "Professional Java Server Programming J2EE 1.3 Edition", Sep. 2001, pp. 1009-1057, WROX.

Supplementary European Search Report for EP 02784131.1 dated Aug. 8, 2007, 4 pages.

Microsoft, "Microsoft.net Framework", Microsoft Corporation, 2001, 54 pages.

Willink, "Meta-Compilation for C++", University of Surrey, Jan. 4, 2000, 379 pages.

Alonso et al., "Advanced Transaction Models in Workflow Contexts", IEEE, Feb. 1996, Proceedings of 12th International Conference on Data Engineering, retrieved from: http://citeseer.ist.psu.edualonso96advanced.html., pp. 574-581.

Van Der Aalst et al., "XML Based Schema Definition for Support of Inter-Organizational Workflow", University of Colorado and University of Eindhoven report, 2000, retrieved from http://citeseer.ist.psu.edu/vanderaalst00mxl.html, 39 pages.

Plaindoux, "XML transducers in Java", May 2002, The Eleventh International World Wide Conference, retrieved from: http://www2002.org/CDROM/poster/132/index.html., 6 pages.

Bogunovic, "A Programming Model for Composing Data Flow Collaborative Applications", Proceedings of the IEEE International Conference on Engineering of Computer Based Systems, Mar. 7-12, 1999, pp. 106-112.

Sung et al. , "A Multimedia Authoring Tool for the Internet", IEEE Transactions on Consumer Electronics, 1997. pp. 304-308.

Smith, et al. "Marching Towards a Software Reuse Future", ACM Ada Letters, Nov./Dec. 1994, pp. 62-72 vol. 14, No. 6.

Mohan et al., "Aries: A Transaction Recovery Method Supporting Fine-Granularity Locking and Partial Rollbacks Using Write-Ahead Logging", ACM Transactions on Database Systems (TODS), Mar. 1992, pp. 94-162, vol. 17, Issue 1.

Bea Systems, Inc., "Transforming Data Using Xquery Mapper", BEA AquaLogic Service Bus 2.0 Documentation, 2006, 19 pages.

Stylus Studio, "Xquery Mapper", 2007, 6 pages, Stylus Studios.

Altova, "XML-toXML Mapping", 2007, 3 pages, Altova Map Force.

Jamper, "Jamper-Java XML Mapper", 2007, 4 pages, Sourceforge.

Sosnoski, "XML and Java technologies: Data binding, Part 1: Code generation approaches—JAXB and more," IBM, Jan. 1, 2003, http://www-128.ibm.com/developerworks/library/x-databdopt/index.html, pp. 1-11.

Chen, et al., "eCo Architecture for Electronic Commerce Interoperability," CommerceNet eCo Framework Project, Jun. 29, 1999, CommerceNet, Inc., pp. 1-107.

Java Debug Interface—definition, retrieved from <URL http://java.sun.com/j2se/1.4.2/docs/guide/jpda/jdi/overview-summary.html on Feb. 21, 2007, pp. 1-3.

Kilgore, "Multi-Language, Open-Source Modeling Using the Microsoft.NET Architecture," Proceedings of the 2002 Winter Simulation Conference, Dec. 8-11, 2002, IEEE, vol. 1, pp. 629-633.

Embury, et al., "Assisting the Comprehension of Legacy Transactions," Proceedings of the Eighth Working Conference on Reverse Engineering, Oct. 2-5, 2001, pp. 345-354.

Mays, et al., "A Persistent Store for Large Shared Knowledge Bases," IEEE Transactions on Knowledge and Data Engineering, vol. 3, No. 1, Mar. 1991, pp. 33-41.

Tang, et al., "Integrating Remote Invocation and Distributed Shared State," Proceedings of the 18th International Parallel and Distributed Processing Symposium, (IPDPS '04), Apr. 26-30, 2004, 10 pages.

Liebmann, et al., "Adaptive Data Dissemination and Caching for Edge Service Architectures built with the J2EE", 2004 Symposium on Applied Computing, Nicosia, Cyprus, Mar. 14-17, 2004, ACM Press, pp. 1717-1724.

HP, "HP Application Server Developer's Guide," Version 8.0 Hewlett-Packard Company, 1999-2001, pp. 27-81, 127-160, 195-271.

* cited by examiner

```
/**
 * @jws:flow flow::
 * <process name-"HelloAsynch">
 *      <receive name="receive" method="helloAsync"/>
 *      <transaction timeout="30" retryCount="3">
 *        <perform name="update1" method="update1"/>
 *        <perform name="update2" method="update2"/>
 *      </transaction>
 *      <receive name="goptTimer" method="helloDelay_onTimeout"/>
 *      <transaction timeout="20" retryCount="2">
 *        <perform name="update3" method="update3"/>
 *        <perform name="update4" method="update4"/>
 *      </transaction>
 *      <perform name="sendReply" method="sendReply"/>
 * </process>
 * ::
 *
 */
```

*Figure 3*

SYSTEMS AND METHODS FOR TRANSACTION CHAINING

CLAIM OF PRIORITY

This application claims priority to U.S. Patent Provisional Application 60/449,925 entitled "SYSTEMS AND METHODS FOR TRANSACTION CHAINING," by Gondi et al., filed Feb. 25, 2003.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

CROSS-REFERENCED CASES

The following applications are cross-referenced and incorporated herein by reference:

U.S. Provisional Patent Application No. 60/376,906 entitled "COLLABORATIVE BUSINESS PLUG-IN FRAMEWORK," by Mike Blevins, filed May 1, 2002;

U.S. Provisional Patent Application No. 60/377,157 entitled "SYSTEM AND METHOD FOR COLLABORATIVE BUSINESS PLUG-INS" by Mike Blevins, filed May 1, 2002.

U.S. Provisional Patent Application No. 60/450,074 entitled "SYSTEMS AND METHODS UTILIZING A WORKFLOW DEFINITION LANGUAGE" by Pal Takacsi-Nagy, filed Feb. 25, 2003.

FIELD OF THE INVENTION

The present invention relates to the filtering of messages in a subscription-based messaging model.

BACKGROUND

In a normal transaction management approach, a first transaction for a first application is "followed" by a second transaction for either the first application or for a second application. Any resources that the first application is holding against a database or resource manager are deleted when the first transaction completes. Further, any context for the first transaction is deleted upon completion. When the second transaction begins, all resources for that transaction must be re-established, including any resources used for the first transaction. This can be inefficient if any of those resources are being used by multiple transactions.

BRIEF SUMMARY

Systems and methods in accordance with one embodiment of the present invention overcome deficiencies in existing transaction management systems by taking advantage of transaction chaining. A transaction management engine, such as a business process management (BPM) engine, can allow an application to define transaction demarcations in order to ensure that portions of a workflow are processed atomically.

Other features, aspects, and objects of the invention can be obtained from a review of the specification, the figures, and the claims.

BRIEF DESCRIPTION OF THE DRAWINGS

FIG. 3 is a code example showing transaction demarcations within a workflow that can be used with the diagram of FIG. 2.

DETAILED DESCRIPTION

Figure 1:
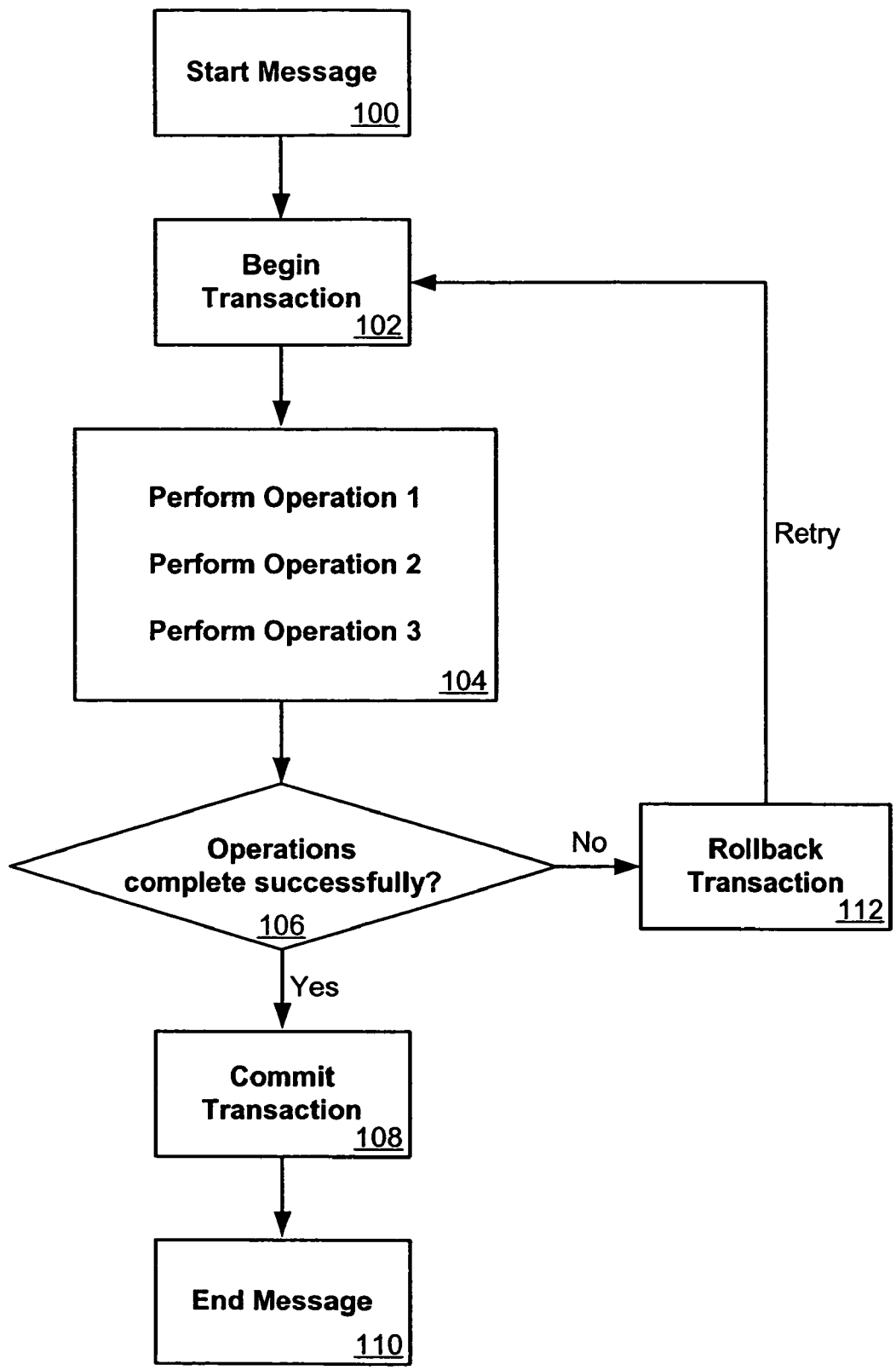
FIG. 1 is a diagram showing a workflow that can be used in accordance with one embodiment of the present invention.

Transaction managers can be used to provide atomicity for a transaction. The "atomicity" of a transaction refers to the fact that a transaction should be done as a single "atomic" unit of work, such that the entire transaction either commits or fails. If a transaction includes multiple updates to a database table, for example, a transaction manager can be used to ensure that either all of the updates get committed to the database, or that none of the updates get committed. Ensuring atomicity through a transaction manager can be substantially more complicated, however, as a transaction manager can be responsible for managing multiple, distributed transactions on a number of databases distributed throughout a system or across a network or server cluster.

Systems and methods in accordance with the present invention provide a transaction manager with the ability to manage a "chained" transaction, or a transaction chain. When allowing for a transaction chain, a transaction manager can maintain certain resources, or can maintain a transaction context, for subsequent transactions. A transaction management engine, such as a business process management (BPM) engine, can allow an application to define transaction demarcations. For example, two tasks can be completed in a business process that transfers money between accounts. First, a specific amount of money needs to be deducted from a first account. Second, that money needs to be transferred into a second account. Assuming that these are separate items of work, it can be desirable to bracket these two activities in a transaction to be an atomic work item, such that either both work items process or neither of them process. It would be undesirable to deduct money from the first account if the money did not actually get added to the second account, and it would not be desirable to add money to the second account if that money was not actually taken out of the first account.

Systems and methods in accordance with one embodiment of the present invention utilize an entity bean to implement this BPM, which can take advantage of transaction bracketing. By utilizing an entity bean, transactions can be managed by an EJB container. When demarcating a transaction boundary for application activities within BPM, the transaction can simply continue to process normally until a transaction bracket is encountered. When a bracket is encountered, a persistent message is queued to the system, such as a JMS message. The queued JMS message allows the system to store context for the transaction. This allows the system to know that, upon the next transaction invoke, the system should start with the next activity within the transaction boundary. In other words, the system is processing the first transaction, then queuing a context that can be picked up and used by the next transaction.

An inbound message bean, or message-drive bean (MDB), can be created if this context is persisted through JMS. The MDB can pull this JMS message from the queue and invoke the BPM with the appropriate message. That message can include information about the next activity that to be executed as part of the transaction, allowing the transaction to maintain context.

If a J2EE-compliant system is being utilized, a mechanism such as a J2EE API could be used for suspending and resuming transactions. When encountering a transaction bracket, the system could suspend the first transaction, process those tasks included within the brackets in the new transaction, commit the new transaction, and resume the original transaction. A problem with such an approach exists, however, as the original transaction can fail after being resumed. The system has then processed an activity beyond the execution path, with no way to automatically undo or rollback the successfully committed transaction when the original transaction rolls back.

In an example shown in FIG. 1, there are three activities 104, or operations, to be performed under a single transaction. Since all three activities are under a single transaction, if the execution of any activity fails for any reason, the transaction rolls back 112 and begins again at the first activity. If the operations succeed 106, the transaction can be committed 108. This can be guaranteed by the transaction semantics. Using a system in accordance with the present invention, activities two and three can be bracketed to be done atomically, or as a single unit of work. In order to bracket activities two and three, the user can place an opening transaction tag before activity two and a closing transaction tag after activity three. These tags can indicate that the second and third activities should be done atomically, such that both activities succeed or neither succeeds.

Figure 4:
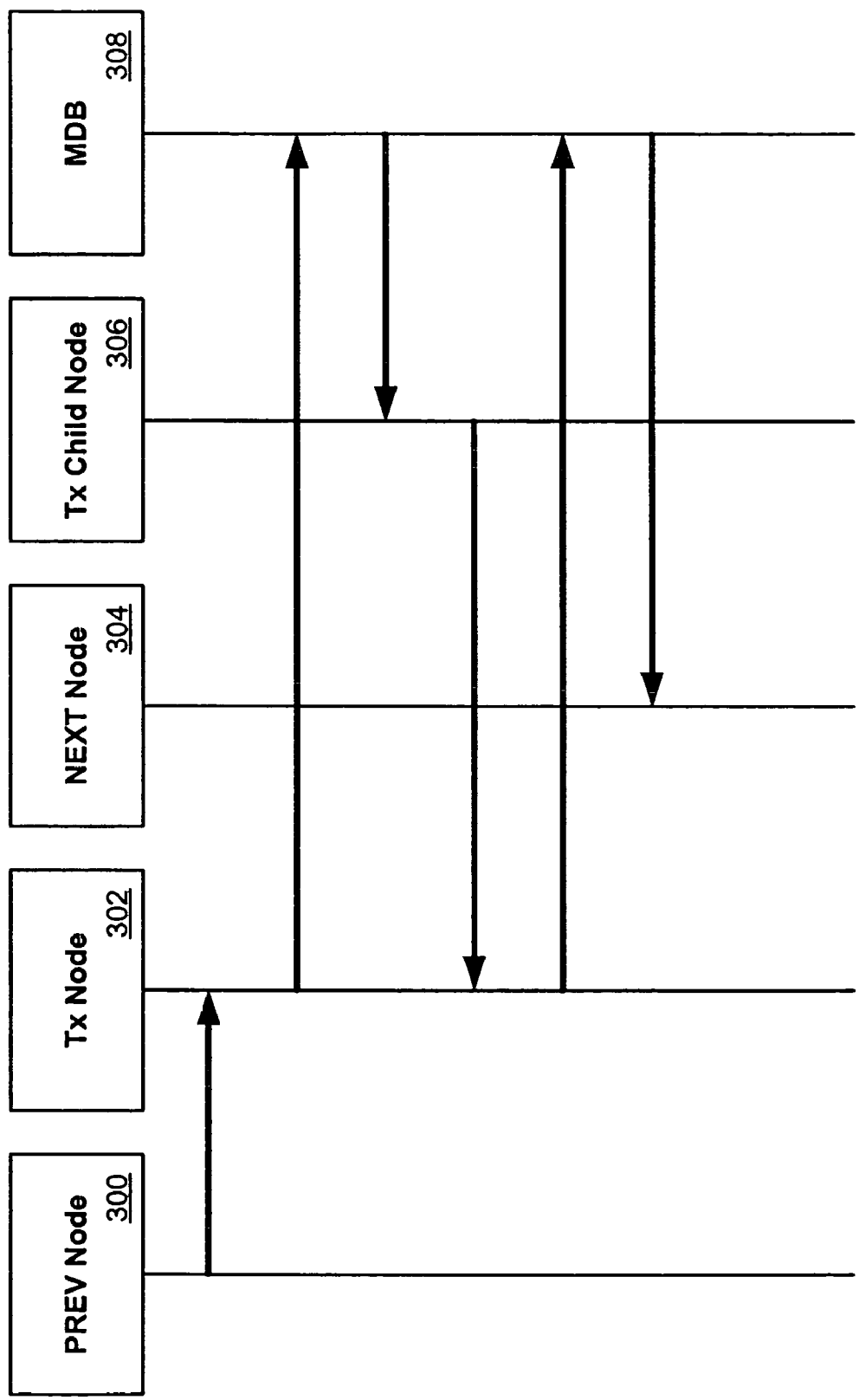
FIG. 4 is a chart showing an execution path that can be used with the diagram of FIG. 2.

When a message is queued as part of the transaction, the transaction can be paused to start a new transaction, in order to implement a new transaction block. If the new transaction fails, since the JMS message is in the first queue, the JMS message can be resent. This can ensure that the transaction manager always continues from the correct location. Since the JMS message is queued, an object is only sent to get that message if the transaction commits. If the queued JMS message and the transaction roll back, the system is basically one step behind and can again attempt to go forward along the path of execution. An example of one such execution path is given in FIG. 4.

A transaction manager can be configured to control the number of retries, or the period of time for retrying a transaction. Attributes in the workflow can be used to specify, for example, a retry count. The transaction itself can also have a retry count. If a JMS message is queued and the message does not commit, the system can generate a callback due to the failure, and that message can have a retry count. So even if the first attempt failed, the user can indicate how many times the message should be retried. These transactions can be implemented as an annotation of a Java Web service (JWS) file in the workflow language (WFL).

Figure 2:
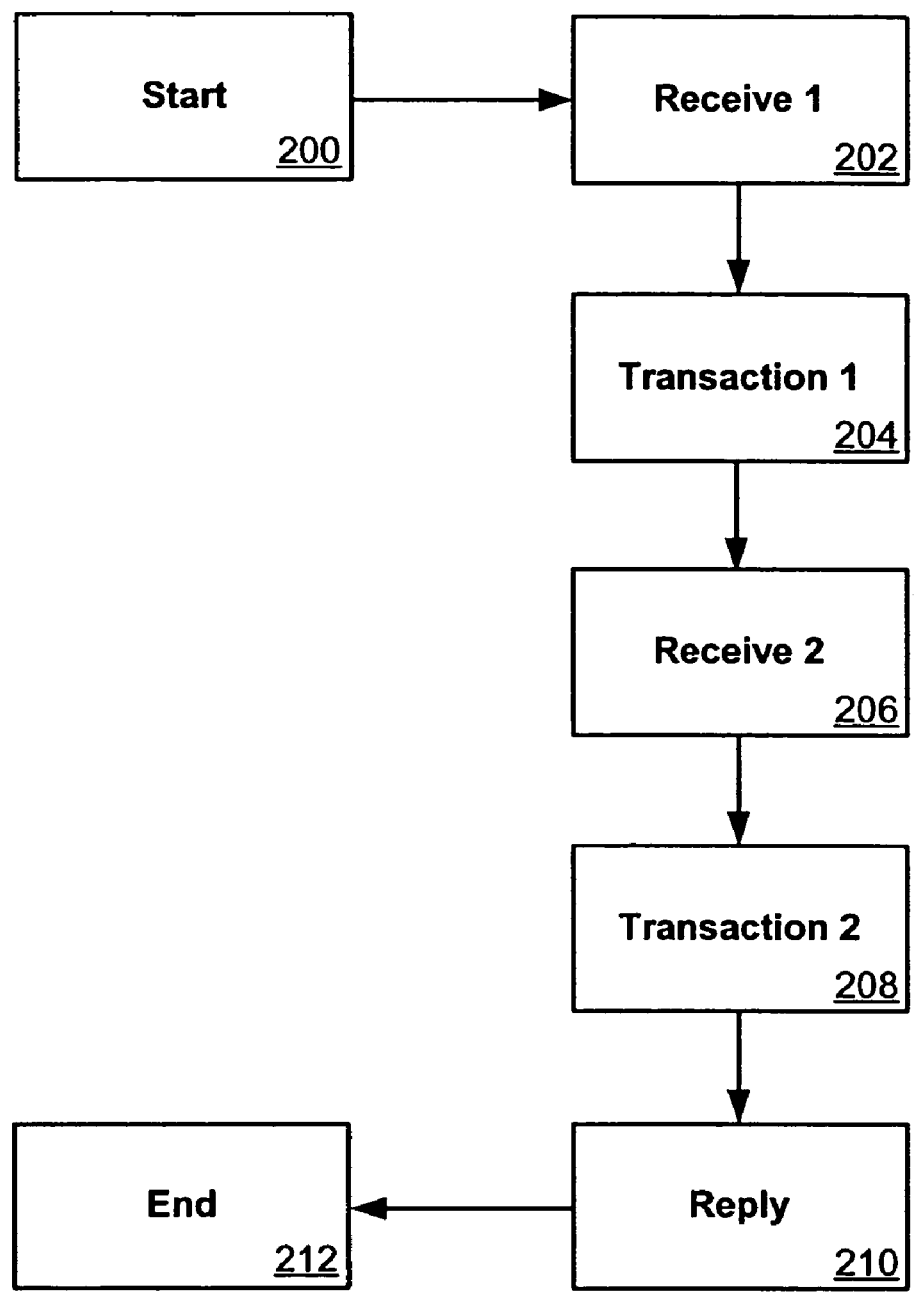
FIG. 2 is a diagram of another workflow that can be used in accordance with one embodiment of the present invention.

When a workflow is implemented in J2EE as an entity bean with container-managed transactions, it can be desirable to have a mechanism to demarcate parts of the workflow as atomic units of work. In other words, it is desirable to commit the existing container-initiated transaction and start a new transaction in order to perform the next unit of work. An example of such a workflow is shown in FIG. 2, where once the workflow is started 200, a message is received 202 to execute the first transaction 204, followed by a message 206 to execute the second transaction 208. After executing the transactions, or failing to execute the transactions, a reply 210 can be sent that can indicate an end 212 to the workflow.

Committing the existing transaction and having the ability to do the next unit of work in a new transaction can be treated as a single operation.

In order to achieve atomicity, a JMS message can be queued to the workflow as part of the existing transaction. If the existing transaction commits, the transaction ensures that the workflow will be invoked, due to the queued JMS message, in a different transaction that can allow the workflow to perform the next unit of work in the newly initiated transaction. When the unit of work is completed, the workflow can queue another JMS message. If this transaction commits, the transaction can ensure that the unit of work has executed in a transaction. When the workflow is invoked again, due to the second JMS message, the workflow can continue its operation in a different transaction.

A transaction can have a tag called <transaction>. A user can include tasks to be performed atomically within the transaction tags. The implication is that all the tasks to be performed should be executed under a single transaction. For example, consider the following workflow:

```
<process>
    <invoke someMethod/>
    <transaction>
        <invoke method1>
        <invoke method2>
    </transaction>
    <invoke someOtherMethod/>
</process>
```

In the above example, someMethod will be executed in a first transaction. The methods method1 and method2 will be executed in a second transaction, demarcated by the opening and closing <transaction> tags. Yet another transaction can be used to execute someOtherMethod. When the workflow encounters a <transaction> tag, the workflow can queue a JMS message containing the information as to the next activity that needs to be executed. Queuing a JMS message as part of an existing transaction also ensures that the workflow will continue only if that transaction commits. The next unit of work is then "chained" to the previous work in the process.

The <transaction> tags ensure that method1 and method2 can be executed atomically. Without such a mechanism, there is no way to demarcate method1 and method2 as a single unit of work using J2EE transactional APIs. It is not possible to simply suspend the current transaction, start a new transaction to do the unit of work, and resume the original transaction, as there will be problems if the new transaction commits and the original transaction rolls back.

Transaction blocks not only can ensure that all operations within a transaction block are performed atomically, but a transaction block can also provide a timeout value for the operations to complete. A transaction block can also provide for retrying the operations in case of failures or timeouts. For example, as shown in FIG. 3, a user can set separate timeout and retry values for each transaction within a workflow. In the first transaction, the timeout value is set to 30 seconds with a retry count of 3, while in the second transaction the timeout value is 20 seconds and the retry count is 2.

Atomic Transactions

Atomic transactions are known as "all-or-nothing" transactions. Actions taken prior to committing an atomic transaction are considered to be tentative or pending, and not persistent or visible to other activities. When an application finishes, the application can make a request to a coordination component to determine an outcome for the transaction. The coordination component can determine whether any of the units of work failed, such as by asking the processes doing those units of work to "vote" or reply whether or not the work items processed successfully. If all the processes vote indicate successful execution, the coordination component can commit all the actions taken. If a process indicates an aborted execution, or does not respond to the request, the coordination component can abort all actions and roll back the transaction. A commit operation makes the tentative actions persistent and visible to other transactions, while a rollback makes the tentative actions appear as if the actions never happened. Atomic transactions can provide consistent failure and recovery semantics, so applications do not need to deal with the mechanics of determining a mutually agreed outcome decision or to figure out how to recover from a large number of possible inconsistent states.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for ensuring atomicity in a workflow, comprising:
   demarcating tasks in the workflow to be processed atomically using transaction tags;
   suspending a first transaction and executing a task from the demarcated tasks in a new transaction when the workflow encounters the transaction tags indicating the new transaction;
   retrying the task for a configurable number of retries or period of time if the task is not performed successfully within a configurable timeout period;
   resuming the first transaction when the task in the new transaction is executed using a processor;
   wherein when one of the transaction tags is encountered, a context relating to the first transaction is queued as a Java Messaging Service (JMS) message as part of the first transaction;
   wherein the JMS message is queued as part of the first transaction, the first transaction is paused to start the new transaction;
   wherein if the new transaction fails, the new transaction rolls back and the queued JMS message is resent from the JMS queue;
   wherein after the new transaction rolls back due to failure and the JMS message is resent, the transaction attempts again to go forward along a path of execution;
   wherein the JMS message is obtained from the queue if the new transaction commits; and
   wherein the transaction tags indicate which tasks are to be performed as a group.

2. A method according to claim 1, further comprising:
   committing the tasks if all the tasks to be processed atomically are successfully processed.

3. A method according to claim 1, further comprising:
   aborting the tasks if any of the tasks to be processed atomically are not successfully processed.

4. A computer program product stored in a storage medium in a general purpose or a specialized digital computer or microprocessor for ensuring atomicity in a workflow, comprising:
   computer code for demarcating tasks in the workflow to be processed atomically using transaction tags;
   computer code for suspending a first transaction and executing a task from the demarcated tasks in a new transaction when the workflow encounters one of the transaction tags indicating the new transaction;
   computer code for retrying the task for a configurable number of retries or period of time if the task is not performed successfully within a configurable timeout period;
   computer code for atomically processing the task;
   computer code resuming the first transaction when the task in the new transaction is executed;
   wherein when one of the transaction tags is encountered, a context relating to the first transaction is queued as a Java Messaging Service (JMS) message as part of the first transaction;
   wherein the JMS message is queued as part of the first transaction, the first transaction is paused to start the new transaction;
   wherein if the new transaction fails, the new transaction rolls back and the queued JMS message is resent from the JMS queue;
   wherein after the new transaction rolls back due to failure and the JMS message is resent, the transaction attempts again to go forward along a path of execution;
   wherein the JMS message is obtained from the queue if the new transaction commits; and
   wherein the transaction tags indicate which tasks are to be performed as a group.

5. A computer implemented system comprising a processor for ensuring atomicity in a workflow, comprising:
   means for demarcating tasks in the workflow to be processed atomically using transaction tags;
   means for suspending a first transaction and executing a task from the demarcated tasks in a new transaction when the workflow encounters the transaction tags indicating the new transaction;
   means for retrying the task for a configurable number of retries or period of time if the task is not performed successfully within a configurable timeout period
   means for atomically processing the task;
   means for resuming the first transaction when the task in the new transaction is executed;
   wherein when one of the transaction tags is encountered, a context relating to the first transaction is queued as a Java Messaging Service (JMS) message as part of the first transaction;
   wherein the JMS message is queued as part of the first transaction, the first transaction is paused to start the new transaction;
   wherein if the new transaction fails, the new transaction rolls back and the queued JMS message is resent from the JMS queue;
   wherein after the new transaction rolls back due to failure and the JMS message is resent, the transaction attempts again to go forward along a path of execution;
   wherein the JMS message is obtained from the queue if the new transaction commits; and
   wherein the transaction tags indicate which tasks are to be performed as a group.

6. A computer system comprising:

a processor;

object code executed by said processor, said object code configured to:

demarcate tasks in a workflow to be processed atomically using transaction tags to indicate the new transaction;

suspend a first transaction and execute a task from the demarcated tasks in a new transaction when the workflow encounters one of the transaction tags indicating the new transaction;

retry the task for configurable number of retries or period of time if the task is not performed successfully within a configurable timeout period;

atomically process the task;

resume the first transaction when the task in the new transaction is executed;

wherein when one of the transaction tags is encountered, a context relating to the first transaction is queued as a Java Messaging Service (JMS) message as part of the first transaction;

wherein the JMS message is queued as part of the first transaction, the first transaction is paused to start the new transaction;

wherein if the new transaction fails, the new transaction rolls back and the queued JMS message is resent from the JMS queue;

wherein after the new transaction rolls back due to failure and the JMS message is resent, the transaction attempts again to go forward along a path of execution;

wherein the JMS message is obtained from the queue if the new transaction commits; and wherein the transaction tags indicate which tasks are to be performed as a group.

* * * * *

UNITED STATES PATENT AND TRADEMARK OFFICE
CERTIFICATE OF CORRECTION

PATENT NO. : 7,584,474 B2 Page 1 of 1
APPLICATION NO. : 10/785702
DATED : September 1, 2009
INVENTOR(S) : Albert Gondi et al.

It is certified that error appears in the above-identified patent and that said Letters Patent is hereby corrected as shown below:

In column 6, line 46, in claim 5, delete "period" and insert -- period; --, therefor.

Signed and Sealed this

Twentieth Day of July, 2010

David J. Kappos
*Director of the United States Patent and Trademark Office*

UNITED STATES PATENT AND TRADEMARK OFFICE
CERTIFICATE OF CORRECTION

PATENT NO. : 7,584,474 B2
APPLICATION NO. : 10/785702
DATED : September 1, 2009
INVENTOR(S) : Gondi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1257 days.

Signed and Sealed this

Fourteenth Day of September, 2010

David J. Kappos
*Director of the United States Patent and Trademark Office*